US009874136B2

(12) United States Patent
McHenry et al.

(10) Patent No.: US 9,874,136 B2
(45) Date of Patent: Jan. 23, 2018

(54) EXHAUST OUTLET ELBOW BOLT PATTERN (71) Applicant: Caterpillar Inc., Peoria, IL (US)

(72) Inventors: Ryan McHenry, Crawfords, IN (US); Lee Kress, Lafayette, IN (US); Andreia Balan, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 334 days.

(21) Appl. No.: 14/581,635

(22) Filed: Dec. 23, 2014

(65) Prior Publication Data
US 2016/0178105 A1  Jun. 23, 2016

(51) Int. Cl.
| F16L 53/00 | (2006.01) |
| F02B 33/40 | (2006.01) |
| F01N 13/08 | (2010.01) |
| F01N 13/18 | (2010.01) |
| F02B 37/00 | (2006.01) |
| F02B 37/18 | (2006.01) |
| F01N 13/14 | (2010.01) |
| F01N 3/04 | (2006.01) |
| F02B 39/00 | (2006.01) |
| F02B 77/11 | (2006.01) |
| F02B 43/10 | (2006.01) |

(52) U.S. Cl.
CPC .............. *F02B 33/40* (2013.01); *F01N 13/08* (2013.01); *F01N 13/14* (2013.01); *F01N 13/1855* (2013.01); *F02B 37/001* (2013.01); *F02B 37/183* (2013.01); *F01N 3/043* (2013.01); *F01N 2340/06* (2013.01); *F02B 39/005* (2013.01); *F02B 77/11* (2013.01); *F02B 2043/103* (2013.01); *Y02T 10/144* (2013.01)

(58) Field of Classification Search
USPC ................. 285/41, 179, 125.1, 124.5, 179.1; 123/559.1, 559.2
See application file for complete search history.

(56) References Cited

U.S. PATENT DOCUMENTS

| 2,458,635 | A | * | 1/1949 | Pitt | F16L 27/1004 285/302 |
| 4,387,914 | A | * | 6/1983 | Paulson | F16L 57/00 138/39 |
| 5,060,984 | A | * | 10/1991 | Hess | B65G 53/523 137/599.01 |
| 5,174,252 | A | | 12/1992 | Binversie et al. | |
| 7,185,490 | B2 | | 3/2007 | Smatloch et al. | |
| 7,234,302 | B2 | * | 6/2007 | Korner | F01D 9/026 285/41 |
| 2004/0262912 | A1 | * | 12/2004 | Bertholin | F16L 49/02 285/41 |

(Continued)

*Primary Examiner* — Aaron Dunwoody (57) ABSTRACT

An exhaust outlet elbow includes: a body having an outer wall and an interior wall, the interior wall defining, at least in part, an interior chamber; a connecting surface located above the interior chamber; and an array of threaded holes located about the connecting surface, wherein the threaded holes terminate in the body. A method of manufacturing an exhaust outlet elbow includes the steps of: forming a body having an outer wall and an interior wall, the interior wall defining, at least in part an interior chamber; forming an connecting surface located between the interior and outer walls; and forming an array of threaded holes in the connecting surface.

9 Claims, 7 Drawing Sheets (56) References Cited

U.S. PATENT DOCUMENTS

| | | | |
|---|---|---|---|
| 2005/0183414 A1* | 8/2005 | Bien | F01N 13/10 |
| | | | 60/323 |
| 2006/0144040 A1* | 7/2006 | Westerbeke, Jr. | F01N 3/04 |
| | | | 60/321 |
| 2010/0229540 A1* | 9/2010 | Waggoner | F01N 3/046 |
| | | | 60/298 |
| 2011/0275945 A1* | 11/2011 | Karla | A61M 39/10 |
| | | | 600/499 |
| 2012/0192557 A1* | 8/2012 | Johnson | F01D 17/105 |
| | | | 60/599 |
| 2012/0198826 A1 | 8/2012 | Aubert et al. | |
| 2012/0260896 A1* | 10/2012 | Saeki | F02B 33/40 |
| | | | 123/559.1 |
| 2013/0098007 A1* | 4/2013 | Waggoner | F01N 3/046 |
| | | | 60/299 |
| 2014/0209071 A1* | 7/2014 | Rienas | F02B 33/44 |
| | | | 123/564 |

\* cited by examiner

EXHAUST OUTLET ELBOW BOLT PATTERN

TECHNICAL FIELD

This patent disclosure relates generally to exhaust outlet elbows for natural gas burning turbocharged engines. More particularly, to a connecting structure for connecting the exhaust elbow to an exhaust system.

BACKGROUND

In areas having cold weather, in particular in the winter, homes require heat to keep the occupants warm. Natural gas is often used as an economical source to generate heat. Natural gas lines may be located in remote areas of the country and require a power source to move the gas in a gas line from point A to point B. Engines, such as turbocharged gas engines may be used as the required power source to move the gas. Turbocharged gas engines are operated at high temperatures and can use natural gas as their fuel source.

An enclosure can be used to store some or all of the turbocharged gas engine components in order to protect the various components during use. However, the enclosure may achieve undesired high temperatures inside the box during the operation of the turbocharged gas engines.

Some turbocharged gas engines may incorporate two turbochargers. Exhaust gases from the engine may be routed into the turbochargers and then directed to the exhaust elbow. The exhaust elbow may be subject to high temperatures as result of being exposed to the engine exhaust gases. An apparatus or method for cooling various components of the exhaust elbow may be desirable. An exhaust elbow may be enlarged to accommodate a cooling system. However enlarging the elbow can create complications particularly at places where space is at a premium. Furthermore, it would be desirable to minimize altering attachment points so that an enlarged, replaced elbow having a cooling system can be made to fit within existing systems with respect to both space limitations and current attachment interfaces.

U.S. Pat. No. 7,185,490 purports to be directed to an exhaust manifold has a head flange constructed for receiving at least two exhaust pipes arranged side-by-side, and includes spaced apart first and second longitudinal flange portions. A mounting assembly is provided for securing the exhaust manifold to a cylinder head of an internal combustion engine in a sealed manor and includes a mounting rail formed with a shoulder which laps over the first longitudinal flange portion and contacts the first longitudinal flange portion in a spring-elastic manner. Plural screw fasteners at least indirectly clamp the second longitudinal flange portion to the cylinder head. However in this patent, the exhaust manifold uses a flange to connect to the engine. At locations where space is at a premium, it would be desirable to have a system and method for attaching a manifold without the use of a flange on the manifold.

SUMMARY

In some aspects, an exhaust outlet elbow includes: a body having an outer wall and an interior wall, the wall defining, at least in part, an interior chamber; a connecting surface located above the interior chamber; and an array of threaded holes located about the connecting surface, wherein the threaded holes terminate in the body.

In some aspects, a method of manufacturing an exhaust outlet elbow includes the steps of: forming a body having an outer wall and an interior wall, the interior wall defining, at least in part an interior chamber; forming a connecting surface located between the interior and outer walls; and forming an array of threaded holes in the connecting surface.

In some aspects, an exhaust outlet elbow includes: a body having an outer wall and an interior wall, the interior wall defining, at least in part, an interior chamber; a connecting surface located above the interior chamber, wherein the connecting surface is located between the interior wall and the outer wall; an array of threaded holes located about the connecting surface, wherein the threaded holes terminate in the body and wherein the holes in the array of threaded holes are equally spaced in a circular pattern and wherein the array of threaded holes are arranged and dimensioned to correspond to holes located in a conduit configured to attach to the connecting surface; and a coolant chamber located in the body.

DETAILED DESCRIPTION

The disclosure relates to a device and method that facilitate the transfer of natural gas from point A to point B. Although turbocharged engines using natural gas as the fuel are discussed herein, the device and method can be used with any type of engine including fossil fueled gasoline engines, and the like in order to prevent undesired temperatures within an enclosure. Further, although two engines are discussed, the device and method can be utilized with more or less engines.

Figure 1:
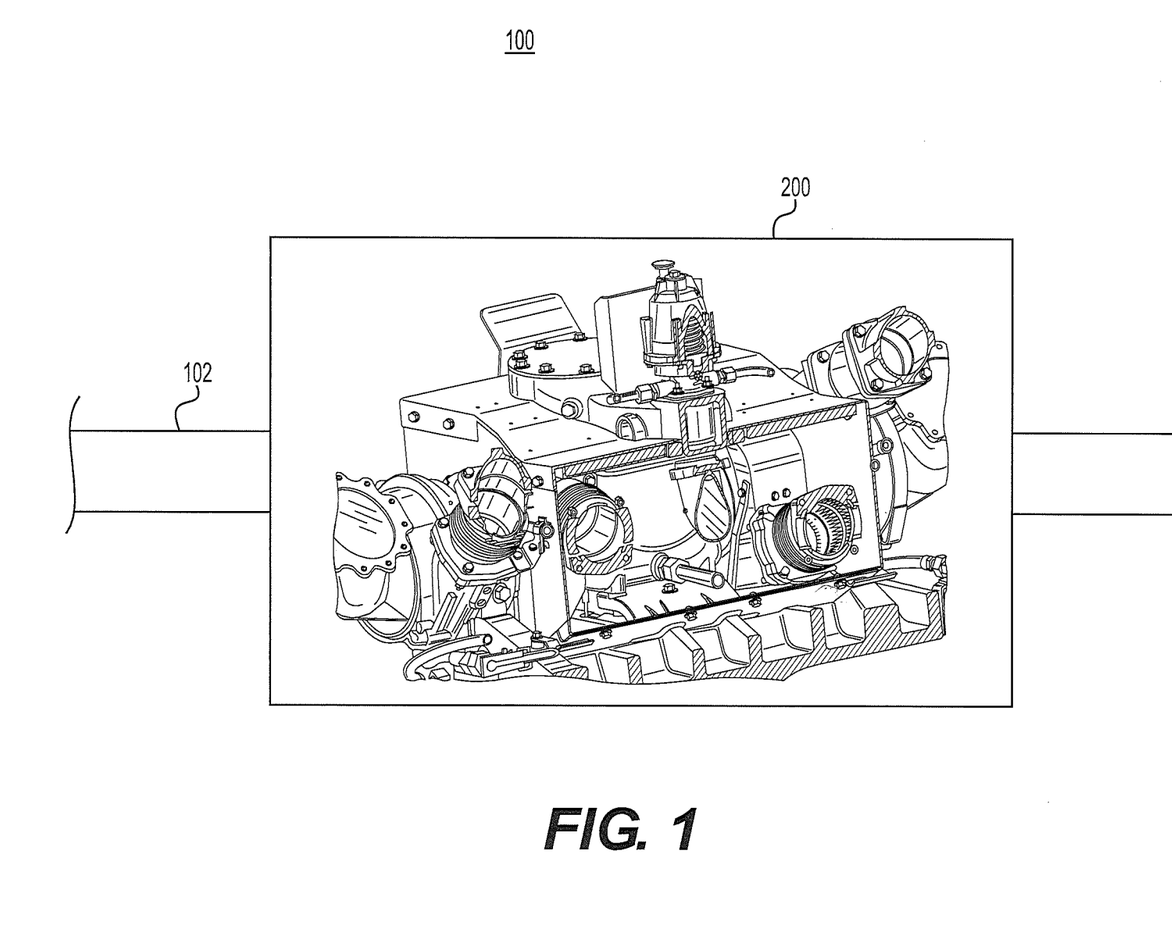
FIG. 1 illustrates a gas line system having turbocharger engines within an enclosure according to an aspect of the disclosure.

FIG. 1 illustrates a gas line system 100 with gas line 102 having turbocharged engines within an enclosure 200 according to an aspect of the disclosure. The gas line 102 provides the conduit to transfer natural gas from point A to point B. The turbocharged engines can utilize natural gas from the gas line 102 to operate and transfer natural gas from point A to point B.

Figure 2:
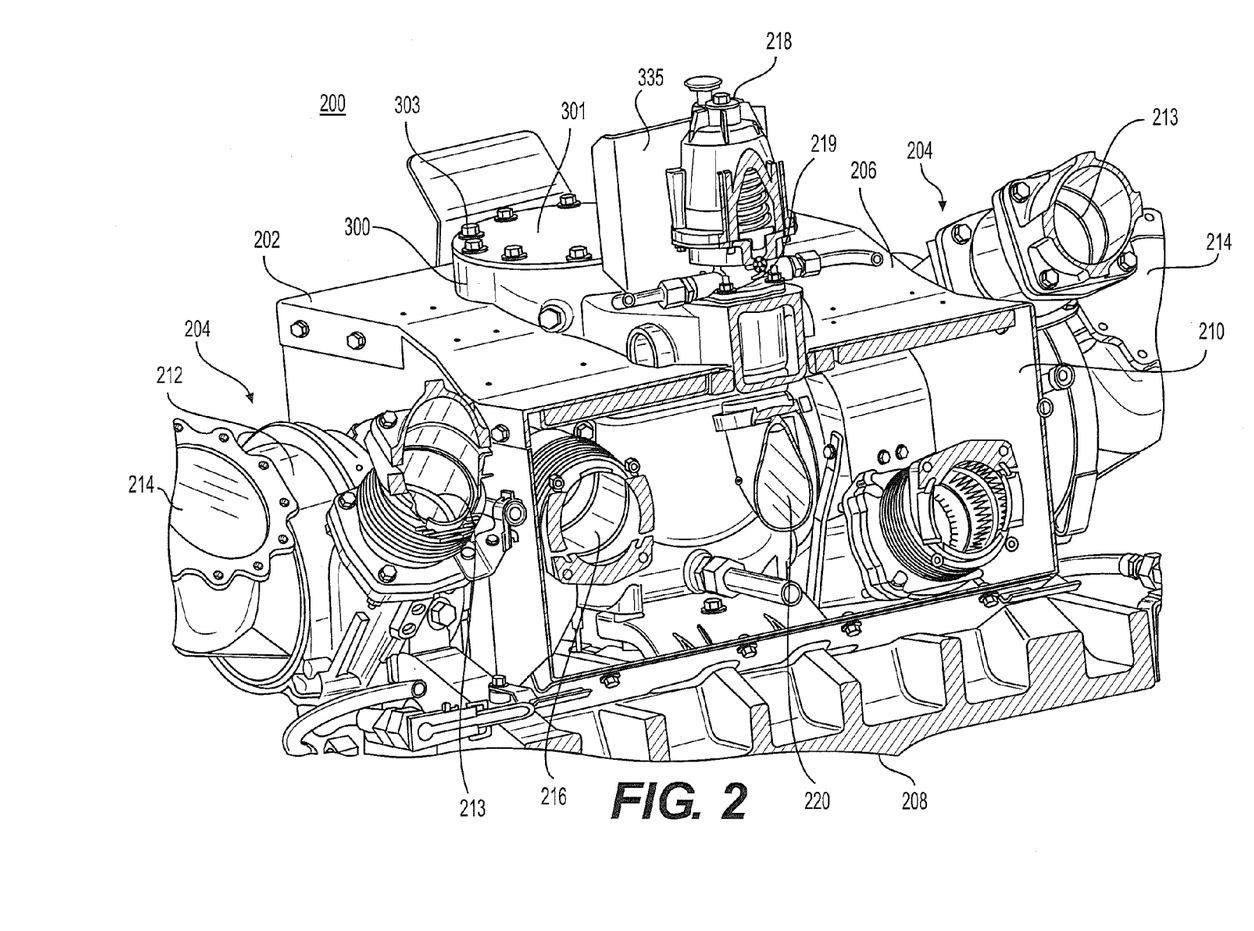
FIG. 2 illustrates a perspective view of the turbocharger engines within the enclosure of FIG. 1 according to an aspect of the disclosure.

FIG. 2 illustrates a perspective view of portions of the turbochargers 204 within the enclosure 200 of FIG. 1 according to an aspect of the disclosure. The enclosure 200 may be positioned on a base 208. The enclosure 200 may be formed using a heat shield 202 that is configured and designed to keep heat within the enclosure 200. Thus, the heat shield may trap so much heat that it may burn the mechanic servicing the enclosure 200 or the trapped heat interferes with the operation of the turbochargers 204. The heat shield 202 may be constructed using thick sheet metal consisting of an inner wall 210 and an outer wall 206 that form a seal so that fluid may be able to circulate therein between according to an embodiment of the disclosure. By allowing fluid to circulate in between the inner wall 210 and outer wall 206, the heat shield 202 can be cooled.

In other embodiments, the heat shield 202 may be made of a material including tin, aluminum, or a composite metal material and the like. The heat shield 202 may be constructed and arranged to house some or all of the components of the turbochargers 204. Turbochargers 204 are shown in FIGS. 1 and 2 as being positioned mainly on either ends of the heat shield 202. The components of the turbochargers 204 can be located inside or outside of the heat shield 202. Alternatively, the heat shield 202 may envelop or house all the components of the turbochargers 204 according to an embodiment of the disclosure. Compressors 212 are also shown positioned outside of the heat shield 202 and having a compressor air outlet 213. Compressor inlet 214 and exhaust lines 216 of turbochargers 204 are also attached to compressors 212.

Also illustrated in FIG. 2, is a waste gate 218 that is positioned above a fluid cooled exhaust outlet elbow 300 having a cover 301 installed for shipping the enclosure 200. The cover 301 is attached to the exhaust elbow 300 by bolts 303. Typically when the exhaust elbow 300 is in use, the cover 301 is removed and a conduit (not shown) is attached to the exhaust elbow 300. The conduit vents the exhaust gases to an appropriate place of deposit which, in some aspects, maybe the atmosphere.

The waste gate's 218 function is to bypass some of the exhaust flow around the turbine section of the turbochargers 204. Exhaust may enter the waste gate 218 through an exhaust outlet 220. The exhaust can help to prevent over speed of the turbochargers 204. As noted above, during use the turbochargers 204 can generate a significant amount of heat within the heat shield 202. By placing the exhaust outlet elbow 300 that is fluid cooled within the heat shield 202, the exhaust outlet elbow 300 can reduce the ambient temperature within the heat shield 202. Controlling the ambient temperature within the heat shield 202 may avoid the temperature within the enclosure 200 from reaching undesired levels.

Figure 3:
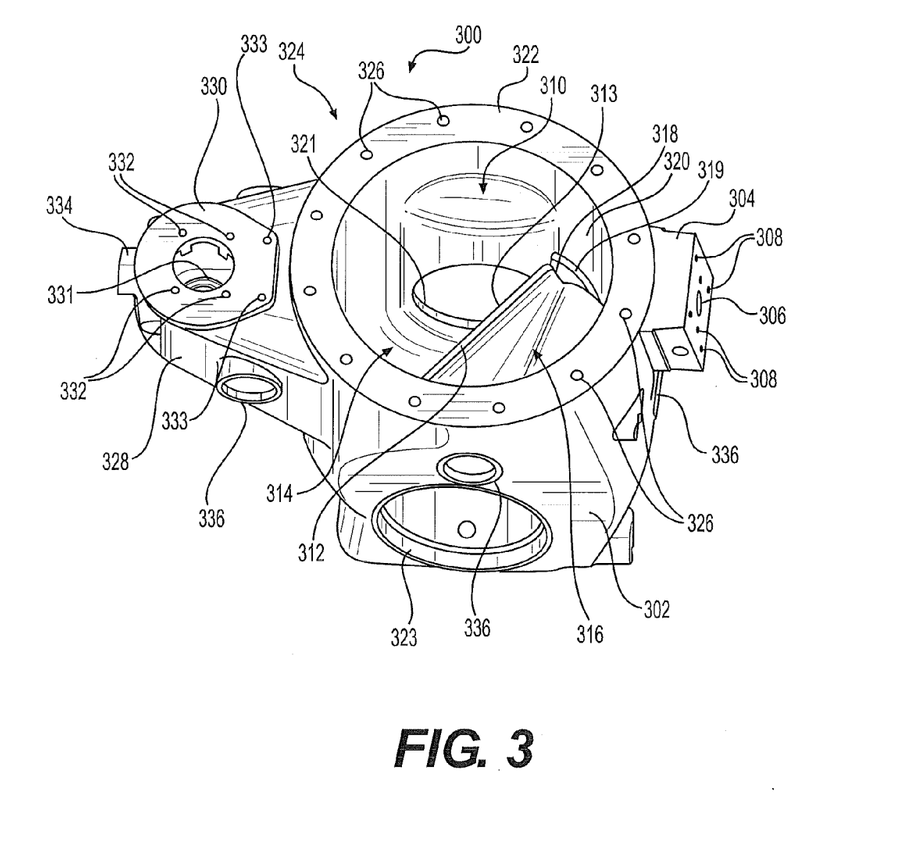
FIG. 3 is a perspective view of an exhaust elbow in accordance with some aspects of the disclosure.

FIG. 3 illustrates an exhaust outlet elbow 300 in accordance with the present disclosure. The exhaust outlet elbow 300 includes a body 302. Occasionally, the body 302 may be referred to as a pot or flowerpot 302. The body 302 is generally made of cast-iron, but, in some aspects the body 302, may be made of other materials such as cast aluminum, steel, or any other metallic or nonmetallic substance. The body 302 may include a boss 304. The boss 304 may have a sensor hole 306 for mounting a NOx, Oxygen, temperature, pressure or any other type sensor (not shown). Other holes 308 may also be located on the boss 304 to help secure the sensor in place. One of ordinary skill in the art will understand that the boss 304 and its associated sensor and other holes 306 and 308 are optional.

The body 302 defines an interior chamber 310. A divider rib 312 is located in the interior chamber 310. The divider rib 312 may be cast with, and be integral with, the body 302. In other aspects, the divider rib 312 may be secured to the body 302 by fasteners, welding, or any other means for attaching the divider rib 312 to the body 302. The divider rib 312 divides the interior chamber 310 into a first side 314 and a second side 316. The divider rib 312 may include a free end 313 opposite the portion of the divider rib 312 that attached to the body 302.

The divider rib 312 may terminate at one end with a scalloped portion 318 adjacent to a stepped portion 319 attached to, or integral with, an interior wall 320 of the body 302. In some aspects, the stepped portion 319 and scalloped portion 318 provide a transition between the interior wall 320 and the divider rib 312. The scalloped portion 318 may include a curved surface curving down from the free end 313 of the divider rib 312 to the stepped portion 319.

A first exhaust inlet 321 provides fluid communication through the body 302 and interior wall 320 to the first side 314 of the interior chamber 310. A second exhaust inlet 323 provides fluid communication from outside of the body 302, through the body 302, and interior wall 320 into the second side 316 of the interior chamber 310. In some aspects, the divider rib 312 is dimensioned and located to provide a barrier from exhaust entering the interior chamber 310 from the first exhaust inlet 321 from flowing through the interior chamber 310 and out the second exhaust inlet 323 and vice versa. In this manner, the divider rib 312 interrupts the flow of exhaust after flowing through the inlets 321, 323 and forces that exhaust to fill the interior chamber 310.

A main or top connecting surface 322 (referred to herein for convenience as a first connecting surface) is located on a top portion of the body 302. The connecting surface 322 is generally flat and contains an array 324 of holes 326. In some aspects, the holes 326 are tapped and provide a way to attach a conduit (not shown), cover 301, or other structures to the body 302. For example, if it were desired to attach a conduit to the body 302, the conduit having a flange may be fitted onto the connecting surface 322 and fasteners may extend through a flange in a conduit (not shown) and attach to the body 302 via the threaded or tapped holes 326.

In some aspects, a waste gate housing 328 is located on the body 302. In some aspects, the waste gate housing 328 may be cast with, and be an integral with, the body 302. In other aspects of the disclosure, the waste gate housing 328 may be attached to the body 302 via fasteners or any other means for attaching the waste gate housing 328 to the body 302. A second connecting surface 330 is located on the waste gate housing 328 which is attached to or integral with the body 302. In some aspects, the second connecting surface 330 may be located adjacent to the first connecting surface 322. The second connecting surface 330 may also contain several connecting holes 332. In some aspects, these connecting holes 332 may also be tapped to accept and secure fasteners such as bolts. The waste gate 218 may be connected to the waste gate housing 328 via bolts 219 (see FIG. 2) fit into the connecting holes 332. Other holes 333 may be used for connecting other features such as a waste gate heat shield 335 as shown in FIG. 2.

In some aspects, particularly in instances where the body 302 is made of a cast material such as cast iron, various freeze plug holes 336 may be located at various locations on the body 302. The freeze plug holes 336 are an artifact of the manufacturing and casting process and are not particularly relevant to specific aspects described in the claims.

Figure 4:
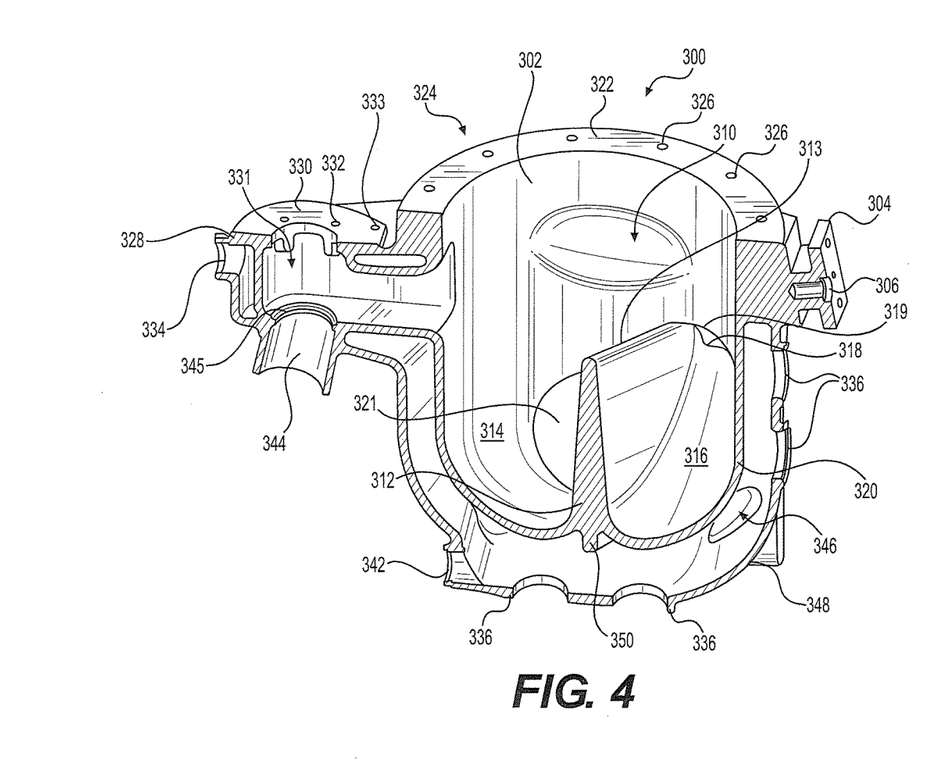
FIG. 4 is a perspective cross-sectional view of an exhaust elbow in accordance with some aspects of the disclosure.

FIG. 4 is a perspective cross-sectional view of an exhaust elbow 300. Aspects and features described above with respect to FIG. 3 are also shown in FIG. 4. For example, FIG. 4 illustrates a body 302 having a boss 304 with a sensor hole 306. The interior chamber 310 can be seen along with the divider rib 312 shown in cross-section. The free end 313 of the divider rib 312 can be seen. The interior chamber 310 is divided into a first side 314 and a second side 316. The scalloped portion 318 and stepped portion 319 can also be seen.

Hot exhaust gases can enter the interior chamber 310 through the exhaust inlets 321 and 323 and waste gate inlet 344 (only inlets 321 and 344 are shown in FIG. 4) and the incoming gases from inlets 321 and 323 contact the divider rib 312. The exhaust gases exit the body 302 by moving straight up into a conduit (not shown) attached to the connecting surface 322. Some of the exhaust gases will enter the waste gate housing 328 via waste gate inlet 344. These gases will also exit the body 302 by moving straight up through the conduit (not shown) attached to the connecting surface 322. Hole 331 provides an entryway for a poppet valve (not shown) in the waste gate 218 to selectively enter the waste gate housing 328 and seal against the valve seat 345.

As one of ordinary skill in the art will appreciate after reviewing this disclosure, the body 302 may become hot as result of being in contact with the exhaust gases. As such, a coolant chamber 346 may be integrated within the body 302. The coolant chamber 346 may be located between the interior wall 320 and the outer wall 348 of the body 302. In some aspects, a coolant such as water, glycol, or any other suitable cooling fluid may be present in the coolant chamber 346. In some aspects, the interior wall 320 may separate the interior chamber 310 from the coolant chamber 346. At other locations, the interior wall 320 merely separates the interior chamber 310 from outside of the body 302.

The coolant chamber 346 may have a coolant inlet 342 and a coolant outlet 334 to allow cooling fluid to flow through the coolant chamber 346 and thereby cool the body 302. As stated above, the freeze plug holes 336 are an artifact of the manufacturing process and are optional features. Generally, while the elbow 300 is in use, the freeze plug holes 336 are filled with a plug or other material in order to prevent cooling fluid from flowing out of the coolant chamber 346.

In some aspects, the rib 312 may include an extended portion 350 that projects into the coolant chamber 346 in order to assist in cooling the rib 312. The extended portion, 350 allows for more cooling surfaces for the coolant to act on.

Figure 5:
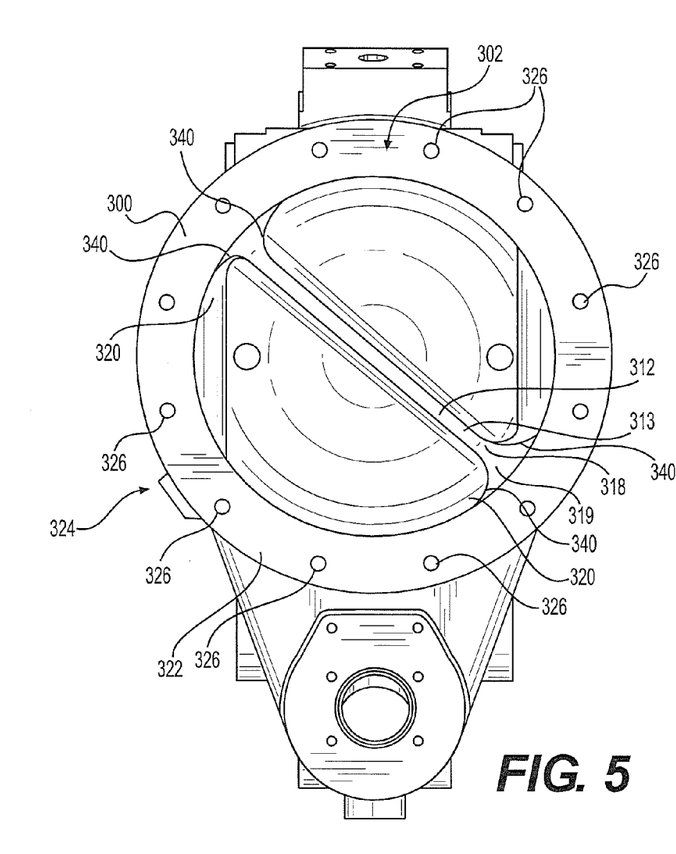
FIG. 5 is a top view of exhaust elbow in accordance with some aspects of the disclosure.

Due to peculiarities of various materials during heating and cooling, certain aspects of the rib 312 may be designed to assist in minimizing thermal stresses due to the expansion and contraction. For example, FIG. 5 illustrates a top of the exhaust outlet elbow 300. The first connecting surface 322 and array 324 of connecting holes 326 are shown. The rib 312 is located below the first connecting surface 322 and attaches to an interior wall 320 at each end with fillets 340. In some aspects, the rib 312 is cast along with the body 302. In such instances, fillets 340 provide a transition between the rib 312 and the interior wall 320 of the body 302. According to some aspects, each end of the rib 312, has a scalloped portion 318 and a stepped portion 319 is located between the free end 313 of the rib 312 and the interior wall 320. The fillets 340 may provide a transfer between the stepped portion 319 and the interior wall 320.

FIGS. 3 thorough 5 illustrate the array 324 of the connecting holes 326. As shown in the FIGS., the threaded connecting holes 326 are not through holes but rather terminate within the body 302 of the elbow 300. The array 324 may include substantially equally spaced holes 326 in a circular pattern as shown. In some aspects, the array 324 may include 12 tapped holes 326. In other aspects, other amounts of tapped holes 326 may be included in the array 324. The array 324 of holes 326 are located in the connecting surface 322 which is located between the interior wall 320 and the outer wall 348 of the elbow 300. In some aspects of the present disclosure, the first connecting surface 322 may be a substantially flat, annular surface. In some aspects, the array 324 of connecting holes 326 may be arranged, located, and dimensioned to correspond to the attaching holes (not shown) located in a conduit (not shown) configured to attach to the connecting surface 322. The second connecting surface 330 may also contain connecting holes 332 that are similar to the connecting holes 326 in that the connecting holes 332 may not be through holes but terminate within the body 302 of the exhaust outlet elbow 300.

Figure 6:
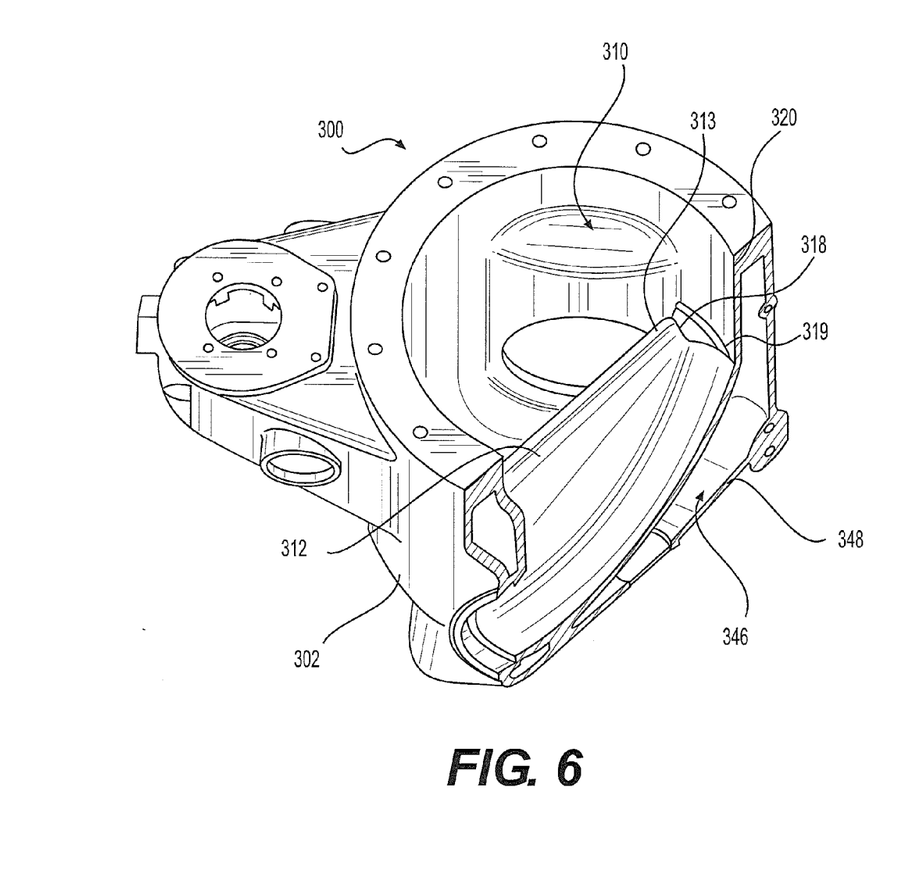
FIG. 6 is a perspective cross-sectional view of an exhaust elbow in accordance with some aspects of the disclosure.

Traditionally, flanges having connecting holes were used rather than having the holes 326 terminate within the body 302 to connect the body 302 to a conduit. The flanges with holes were used because the heat associated with hot exhausts could cause the components such as fasteners, washers, holes, etc. to become so hot that the components would seize within the body 302 making it difficult to change the exhaust conduit (not shown) or remove the body 302 from the conduit. However, in some aspects of the present application, the problem of heat causing the fasteners to seize is addressed by the fact that the cooling chamber 346 extends near the connecting surface 322 as shown in FIG. 6. The coolant in the cooling chamber 346 can reduce the amount of heat in the connecting surface 322 and any fasteners or bolts 303 located in the tapped holes 326, and thereby prevent the fasteners 303 from seizing in place. As a result, the location of the cooling chamber 346 extending proximate to the attaching surface 322 allows for the holes 326 to terminate with the body 302 and obviates the need for a flange.

FIG. 6 is a perspective, cross-sectional view of the exhaust outlet elbow 300 showing the rib 312 having a scalloped portion 318 and the stepped portion 319. As can be seen in FIG. 6, the coolant chamber 346 is defined by the outer wall 348 of the body 302 and the interior wall 320 of the body 302, extends behind the interior wall 320 where the stepped portion 319 meets the scalloped portion 318 of the rib 312. The scalloped portion 318 may include a curved surface that provides a transition between the free end 313 and stepped portion 319. Therefore, the free end 313 of the rib 312 is prevented from directly contacting the portion of the interior wall 320 that separates the interior chamber 310 from the coolant chamber 346.

In some aspects, it may be desired to prevent the free end 313 of the rib 312 from directly contacting the portion of the interior wall 320 that provides a barrier between the coolant chamber 346 and the interior chamber 310 because a portion of the interior wall 320 may be significantly cooler due to the coolant in the coolant chamber 346 then the free end 313 of the rib. As result of the separation, undue thermal stress on the free end 313 of the rib 312 may be avoided.

Figure 7:
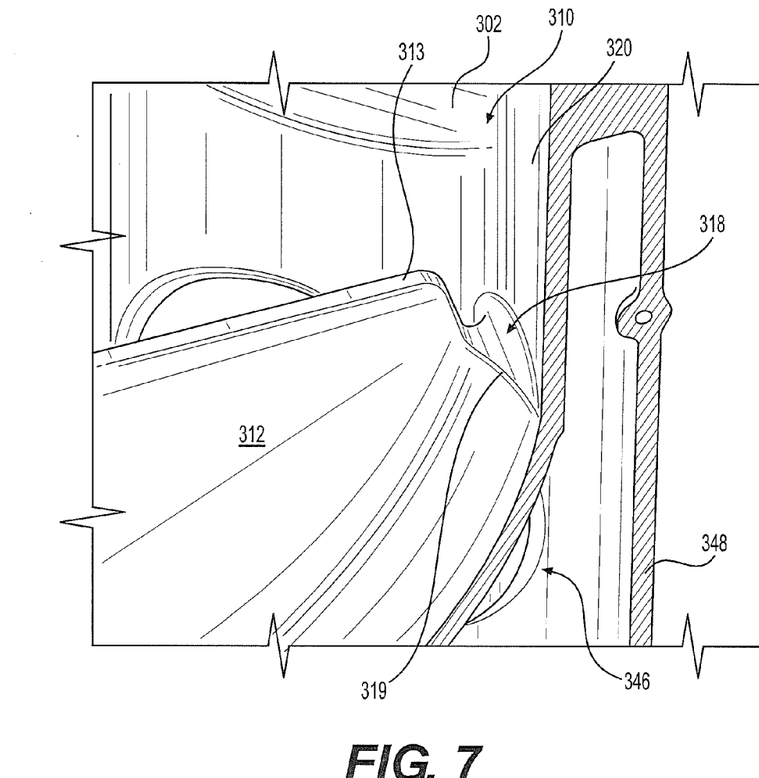
FIG. 7 is a partial, perspective, cross-sectional view of a portion of the exhaust elbow in accordance with some aspects of the disclosure.

Additional detail of an example of the scalloped portion 318 is illustrated in FIG. 7. The rib 312 is located in the interior chamber 310 of the body 302. The scalloped portion 318 of the rib 312 includes a curved surface providing a transition between the free end 313 of the rib 312 and the stepped portion 319. The coolant chamber 346 located between the outer wall 348 and the interior wall 320 of the body 302 can also be seen.

INDUSTRIAL APPLICABILITY

As one of ordinary skill the art can appreciate after reviewing this disclosure, exhaust outlet elbows for turbochargers may provide a variety of functions. For example, the exhaust elbow provides a variety of places for the exhaust gases to be diverted. Providing various inlets for the exhaust gases to flow into is one useful feature of the exhaust elbow.

It is desirable to provide structure within the exhaust outlet elbows to hinder gases entering the exhaust outlet elbow from one turbocharger to flow into the second turbocharger. As such, the divider rib as shown is used to hinder flow of exhaust gases from one turbocharger to the other. Due to the high temperatures of exhaust gases the exhaust elbow itself may become very hot. In order to control or regulate how hot the exhaust elbow gets, coolant may flow through the exhaust elbow through a cooling chamber.

As one of ordinary skill the art can appreciate after reviewing this disclosure, portions of the exhaust elbow that are in contact with the cooling chamber may be cooler than other aspects of the exhaust elbow not in direct contact with the cooling chamber. Therefore, different aspects of the exhaust elbow may be at very different temperatures. During operation, differences in temperature within the exhaust elbow may be quite large. As a result, it may be desirable to prevent some portions of the exhaust elbow from contacting other portions of exhaust elbow which can be at a greatly different temperature in order to avoid thermal stresses and/or other undesirable effects. In order to provide thermal transitions features, the scalloped portions, fillets, and stepped portions may be used.

Because of the complex and ever evolving requirements placed upon modern machinery such as exhaust elbows, various improvements to the elbows may be made over time. As such, it may be desirable to maintain various interfaces so that elbows can be removed and replaced within larger machines without having to reconfigure connection points. Therefore, arranging fasteners in standard arrays dimensioned to be the same as former arrays may be desirable. Furthermore, the ability to provide an array of holes that are tapped directly as part of the body enables the body to be of a larger diameter than previous exhaust apparatuses which relied on flanges having holes at various attachment points.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the invention to the exact construction and operation illustrated and described, and accordingly, all suitable modifications and equivalents may be resorted to, falling within the scope of the disclosure.

What is claimed is:

1. An exhaust outlet elbow comprising:
   a body having an outer wall and an interior wall, the interior wall defining, at least in part, an interior chamber;
   a coolant chamber located between the outer wall of the body and the interior wall;
   a first and second exhaust inlets providing a fluid connection through the outer wall and interior wall to the interior chamber, wherein the first and second exhaust inlets are separated by a rib having a scalloped portion;
   a connecting surface located adjacent to the interior chamber, wherein the connecting surface is bounded by the interior wall and the outer wall; and
   an array of threaded holes located about the connecting surface, wherein the threaded holes terminate in the body.

2. The exhaust outlet elbow of claim 1, further comprising a waste gate housing integrated into the body.

3. The exhaust outlet elbow of claim 2, further comprising a second array of threaded holes located about a second connecting surface located on the waste gate housing, wherein the second array of threaded holes terminate in the waste gate housing.

4. The exhaust outlet elbow of claim 1, wherein the array of threaded holes includes 12 threaded holes.

5. The exhaust outlet elbow of claim 1, wherein the holes in the array of threaded holes are equally spaced in a circular pattern.

6. The exhaust outlet elbow of claim 1, wherein the connecting surface is a relatively flat, annular, surface located between the outer wall and the interior wall.

7. The exhaust outlet elbow of claim 1, wherein the body is cast and the array of threaded holes are located in the cast body.

8. The exhaust outlet elbow of claim 1, wherein the array of threaded holes are arranged and dimensioned to correspond to holes located in a conduit configured to attach to the connecting surface.

9. The exhaust outlet elbow of claim 1, wherein the coolant chamber extends to a position proximate to the array of threaded holes.

* * * * *